US008175999B2

(12) United States Patent
Shimony et al.

(10) Patent No.: US 8,175,999 B2
(45) Date of Patent: May 8, 2012

(54) OPTIMAL TEST ORDERING IN CASCADE ARCHITECTURES

(75) Inventors: Eyal Shlomo Shimony, LeHavim (IL); Ronen Brafman, Ramot Meir (IL); Daniel Berend, Beer Sheva (IL); Shimon Cohen, Ness Ziona (IL)

(73) Assignees: Orbotech, Yavne (IL); Ben Gurion University, Beer Sheva (IL)

( * ) Notice: Subject to any disclaimer, the term of this patent is extended or adjusted under 35 U.S.C. 154(b) by 119 days.

(21) Appl. No.: 12/296,934

(22) PCT Filed: Sep. 3, 2008

(86) PCT No.: PCT/IB2008/053565
§ 371 (c)(1),
(2), (4) Date: Oct. 13, 2008

(87) PCT Pub. No.: WO2009/077880
PCT Pub. Date: Jun. 25, 2009

(65) Prior Publication Data
US 2011/0208683 A1    Aug. 25, 2011

Related U.S. Application Data

(60) Provisional application No. 61/006,041, filed on Dec. 17, 2007.

(51) Int. Cl.
*G06F 17/10* (2006.01)
*G06F 19/24* (2011.01)
*G06K 9/62* (2006.01)
*G06K 9/46* (2006.01)

(52) U.S. Cl. .............. 706/52; 706/20; 706/29; 382/159; 382/190

(58) Field of Classification Search ............ 706/52
See application file for complete search history.

(56) References Cited

U.S. PATENT DOCUMENTS 7,050,922 B1    5/2006   Zhou

OTHER PUBLICATIONS

Kaynak et al., MultiStage Cascading of Multiple Classifiers: One Man's Noise is Another Man's Data [online], 2000 [retrieved on Nov. 28, 2011]. Retrieved from the Internet< URL:http://citeseerx.ist.psu.edu/viewdoc/summary?doi=10.1.1.17.4851>.*
Monma et al. (Monma), "Sequencingw ITH Series-Parallepl Recedence Constraints", 1979.*
Marlon Nunez. The Use of Background Knowledge in Decision Tree Induction. *Machine Learning* vol. 6 , Issue 3 (May 1991) pp. 231-250.
Peter D. Turney Cost-Sensitive Classification: Empirical Evaluation of a Hybrid Genetic Decision Tree Induction Algorithm. *Journal of Artificial Intelligence Research*. pp. 369-409, 1995.
Charles X. Ling et al Decision tree with minimal costs, in International Conference on Machine Learning (IMCL), 2004.

(Continued)

*Primary Examiner* — Jeffrey A Gaffin
*Assistant Examiner* — Nathan Brown, Jr.
(74) *Attorney, Agent, or Firm* — Mark M. Friedman

(57) ABSTRACT

Methods for optimizing the cost of executing a set of tests including finding the optimal ordering of the tests for some important cases such as set of tests having series-parallel structure with no statistical dependencies, and near-optimal orderings for the rest of the cases, such that the resources required for executing the tests are minimized.

24 Claims, 10 Drawing Sheets

OTHER PUBLICATIONS

Valentina Bayer Zubek and Thomes G. Dietterich, Pruning improves heuristic search for cost-sensitive learning, in ICML pp. 19-26, 2002.

Paul A. Viola and Michael J. Jones, Rapid object detection usinga boosted cascade of simple features. In Comuter Vision and Pattern Recognition (CVPR) pp. 511-518, 2001.

Eric Horvitz and Jed Lengyel, Perecption, attention, and resources: A Deciison-Theoretic Approach to Graphics Rendering, In Proceedings of UAI pp. 238-249, Aug. 1997.

J. K.Lenstra and A.H. G.Rinnooy kan. Complexity of Schduling under Precedence Constraints, Operations Research vol. 26, No. 1 Jan.-Feb. 1978.

Clydel L. Monma and Jefferey B. Sidney, Sequencing with Series-Parallel Precedence Constraints, Mathemtics of Opretions Research vol. 4, No. 3Aug. 1979.

Paul A. Viola and Michael J. Jones, Rubust Real-Time Face Detection. International Journal of Computer Vision 57(2) pp. 137-154, 2004.

* cited by examiner

OPTIMAL TEST ORDERING IN CASCADE ARCHITECTURES

RELATED APPLICATION

This application claims priority to Applicant's U.S. Provisional Patent Appl. No. 61/006,041 titled "FEATURE ORDERING FOR RAPID OBJECT DETECTION" filed Dec. 17, 2007, and is a National Phase filing of PCT/IB2008/053565 filed on Sep. 3, 2008, the entirety of which is hereby incorporated by reference herein.

FIELD OF THE INVENTION

Aspects of the present invention relate to optimal test ordering in cascade architectures, providing a provable method for optimal ordering of tests for some important cases, and near-optimal orderings for the rest of the cases.

BACKGROUND AND PRIOR ART

In numerous classes of applications, including object detection and acceptance test applications, an important issue is to classify objects or make other decisions in real-time. For instance, security systems need to detect targets in real-time and to act on them. Robots need to quickly decide whether an observed artifact is an obstacle, in order to avoid collision. Factory inspection lines must decide as quickly as possible whether or not a manufactured object is faulty. This type of issue has been addressed in work in Machine Learning on the induction of cost-sensitive classifiers, and in particular cost-sensitive decision trees. In this line of research, the goal is to induce a classifier in which the expected cost of tests, and possibly misclassification costs, is minimized. See for example: Marlon N'unez, *The use of background knowledge in decision tree induction*, Machine Learning, 6: pages 231-250, 1991; Peter D. Turney, *Cost-sensitive classification: Empirical evaluation of a hybrid genetic decision tree induction algorithm*, Journal of Artificial Intelligence Research (JAIR), 2: pages 369-409, 1995; and Charles X. Ling, Qiang Yang, Jianning Wang, and Shichao Zhang, *Decision trees with minimal costs*, in International Conference on Machine Learning (ICML), 2004. Most work in this area explores various heuristics and techniques for generating such trees, although Valentina Bayer Zubek and Thomas G. Dietterich, *Pruning improves heuristic search for cost-sensitive learning*, in ICML, pages 19-26, 2002, is an exception in which an optimal tree results from solving an appropriate Markov Decision Process (MDP). However, the size of the MDP is exponential in the number of attributes, and in general an optimal solution cannot be found.

In order to simplify the processing, the idea of a cascade system was proposed by Viola: Paul A. Viola and Michael J. Jones, *Rapid object detection using a boosted cascade of simple features*, in Computer Vision and Pattern Recognition (CVPR) (1), pages 511-518, 2001. An example cascade is illustrated in FIG. 1 (Prior art). A cascade system is composed of simple detectors 10, each computing one test. For each detector 10, a rejection threshold used for rejection 20 of non-object examples (also called "samples") is learned offline. Difficult examples that pass through the entire sequence of filters arrive at the final stage where an Ada Boost classifier is used to classify those examples into objects or non-objects.

An important idea behind cascade architectures, as suggested by Viola is to introduce weak classifiers 30 that can classify (hereinafter referred to as "reject") many examples quickly, thus saving considerable computation time, leaving the rest of the examples to be classified later on in the cascade.

Assuming that a rejection event is always correct, and that all detectors are in the cascade, the classification accuracy is independent of the ordering. Basically, In Viola's scheme, the detectors are ordered such that detectors with high reject probability are placed first, ignoring their runtime. When some detectors require a much larger runtime than others, this becomes problematic in that the resulting runtime is far from optimal.

There is therefore a need and it would be advantageous to have methods to optimize the runtime, preferably without impinging on overall classification accuracy.

Related art is described in Eric Horvitz and Jed Lengyel, *Perception, attention, and resources: A decision-theoretic approach to graphics rendering*, in Proceedings of UAI (Conference on Uncertainty in Artificial Intelligence), pages 238-249, August 1997. Methods exemplified by Horvitz et al consist of schemes for reasoning in order to get optimal expected reward, one special case being optimization of expected runtime. But in these methods considering stoppage of a test sequence when a reject is detected is not relevant and has thus not been considered.

There is therefore a need and it would be advantageous to have methods to optimize tests in a cascade that can detect "rejects" quickly and optimize the runtime of the tests in the cascade, preferably without impinging on overall classification accuracy.

In a cascade, some weak classifiers used in related art, compute features or classifiers as an intermediate computation, creating a structural dependency, which also entails an ordering constraint. Hence it is the intention of the present invention to consider both statistical dependencies and ordering constraints. It is a further intention of the present invention to provide a provably optimal ordering of tests for some important cases, and near-optimal orderings for the rest of the cases.

The term "ordering constraint," as used with a cascade of tests, refers herein to a prerequisite constraint that a particular test in the cascade run before another particular test. The representation for the ordering constraints is as a partial order. A partial order can also be represented as a directed graph as a notational variant. Whenever A must appear before E this constraint is denoted by A→E or by "A before B". Formally, an immediate successor of a test C is a test D, such that there exists no test Z with C→Z→D. In this case we also refer to C as an immediate prerequisite of D.

The term "statistical dependency," as used with a cascade of tests, refers herein to the fact that the reject probability of a test may depend statistically on the results of previously run tests. In a set of tests $X=\{x_1, x_2, \ldots, x_n\}$ conditions under which statistical dependencies between the tests can be handled, are analyzed. Denote $r_{i|S}$ as the probability that test $x_i$ rejects given previous occurrences S, where typically S would be the reject and/or non-reject of previous tests. For example, $r_{i|j}$ denotes the probability that test $x_i$ does not reject given that $x_j$ has rejected.

DEFINITION OF THE PROBLEM

Given is a set of tests (alternately called "detectors") $X=\{x_1, x_2, \ldots, x_n\}$ for detecting a certain property, such as a defect in an object, such as a product or a service or a portion thereof. Each test results in a "pass" "reject" or "don't know". In cascade architecture, the object is tested by a sequence of tests (typically a permutation of all the above tests). Also given is an execution time for each test, and a probability of "reject" for each test (possibly conditional on results of previous tests, in the case of statistical dependency). The problem is to find an ordering of the tests in the cascade which is optimal with respect to the total expected runtime of the cascade. It should be noted that time is used as a non-limiting exemplary resource needed to perform tests in the cascade.

It is possible that in the cascade computations are re-used by detectors, resulting in ordering constraints between tests. Also, it is possible that tests be statistically dependent. The present invention considers ordering problems under various settings of dependency assumptions of both types.

The marginal probability that detector $x_i$ rejects (necessitating no further processing) is denoted by $r_i$, $t_i$ denotes the execution time (exemplifying the resources needed to execute test $x_i$) for test $x_i$, and $qi=ri/ti$ denotes the "quality" of the test. The reject rate of a sequence S, composed of all tests in any order, is given by:

$$R(s) = 1 - \prod_{i=1}^{n}(1-r_i) \quad (1)$$

The expected runtime of the sequence, assuming that the sequence is ordered according to the initial indexing of the tests, is given by:

$$T(s) = \sum_{i=1}^{n} t_i \prod_{j=1}^{i-1}(1-r_j) \quad (2)$$

(using the convention that a product over an empty set is 1). The "quality" measure for the sequence as a whole is defined as:

$$Q(S) = \frac{R(S)}{T(S)}. \quad (3)$$

Equation (3) defines the quality of any sequence of tests, consisting of any arbitrary subsequence of X.

In some variations of the present invention, we allow for a case where a reject decision may be in error. In this case we assume that a test $x_i$ falsely rejects examples with a known probability $f_i$. Here the ordering of tests may affect F, the expected number of incorrectly rejected examples. A tradeoff factor C, specified by the user of the system, is assumed. The meaning of this tradeoff is that the user is willing to accept an increased incorrect rejection probability (decreased accuracy) as long as the expected runtime is reduced by at least C time units per unit of decreased accuracy. The goal of the present invention in this extended case is to minimize the expectation of T+C*F.

It should be noted that the present invention uses the notion of r/t which corresponds to the idea of ratio of incremental gain to computational cost, referred to as "refinement rate" in Horvitz. While time is equivalent to computational cost of related literature, it is not clear in what way our rejection probability can behave like incremental gain. Additionally, in our setting of independent detector ordering, sorting according to r/t gives provably optimal expected time. In the setting of Horvitz, only approximate optimality can be shown. In all other schemes above, even approximate optimality in runtime is not guaranteed. Other prior art, such as U.S. Pat. No. 7,050,922 given to Zhengrong Zhou, uses the product (1−r)*t and sorts the tests such that the test with smallest (1−r)*t is run first. However, such a method results in an expected time that can be far from optimal.

SUMMARY OF THE INVENTION

Aspects of the present invention includes providing methods of optimizing the cost of executing a set of processes such as detecting defects, or other testing processes, hereinafter collectively and alternately referred to as "tests" or "detectors". The cost of executing each test of the set of tests are the resources invested in running the tests, such as the test execution time, hereinafter collectively and alternately referred to as "runtime" of one or more tests of the set of tests. The set of test is collectively and alternately also referred to as a "cascade" of tests. It should be noted that the runtime is used as a non-limiting exemplary resource needed to perform the tests in a cascade. Each test is capable of detecting or identifying a feature, which if detected, terminates the cascade. Such an occurrence is referred to as a "reject".

Optimizing the cost of executing a set of tests includes finding the optimal ordering of the tests for some important cases, and near-optimal orderings for the rest of the cases, such that the resources required for executing the tests are minimized.

In accordance with aspects of the first embodiment of the present invention, a method is provided for an optimal ordering of tests, wherein there are no pre defined order constraints between tests and no statistical dependencies between tests.

In accordance with aspects of the second and third embodiments of the present invention, methods are provided for an optimal ordering of tests, wherein there are pre defined order dependencies between tests, but no statistical dependencies between tests.

In accordance with aspects of the fourth and fifth embodiments of the present invention, methods are provided for an optimal ordering of tests, wherein there are statistical dependencies between tests.

Additional advantages and novel features relating to the present invention will be set forth in part in the description that follows, and in part will become more apparent to those skilled in the art upon examination of the following or upon learning by practice of aspects of the invention.

BRIEF DESCRIPTION OF THE DRAWINGS

The present invention will become fully understood from the detailed description given herein below and the accompanying drawings, which are given by way of illustration and example only and thus not limitative of aspects of the present invention discussed here, and wherein:

FIG. 9b is the SPE representation of the example shown in FIG. 9a

DETAILED DESCRIPTION

Aspects of the present invention now will be described more fully hereinafter with reference to the accompanying drawings, in which variations and aspects of the present invention are shown. Aspects of the present invention may, however, be embodied in many different forms and should not be construed as limited to the variations set forth herein; rather, these variations are provided so that this disclosure will be thorough and complete, and will fully convey the scope thereof to those skilled in the art.

Unless otherwise defined, all technical and scientific terms used herein have the same meaning as commonly understood by one of ordinary skill in the art to which aspects of the present invention belong. The methods and examples provided herein are illustrative only and not intended to be limiting.

By way of introduction, aspects of the present invention include providing methods of optimizing the cost of executing a set of tests, wherein optimizing the cost of executing the set of tests includes finding the optimal ordering the tests for some important cases, and near-optimal orderings for the rest of the cases, such that the resources required for executing the tests are minimized.

First Embodiment: Statistical Independence and No Ordering Constraints

In accordance with aspects a first embodiment of the present invention, a method is provided for an optimal ordering of tests in a cascade, wherein there are no pre defined order constraints between tests and no statistical dependencies between tests.

$q_i$ denote the tests qualities. Intuitively, quality represents the fraction of objects rejected by the test per unit time. It is thus very intuitive that tests be ordered by this quality measure:

Given a set of tests $X=\{x_1, x_c, \ldots, x_n\}$ the tests being both statistically independent and have no ordering constraints, ordering the tests in decreasing quality results in a minimal expected runtime of set X. Following Equation (2), the problem is reduced to finding the permutation O that minimizes the expected runtime:

$$ET(o) = \sum_{i=1}^{n} to_i \prod_{j=1}^{i-1} (1 - ro_j) \qquad (4)$$

Figure 1:
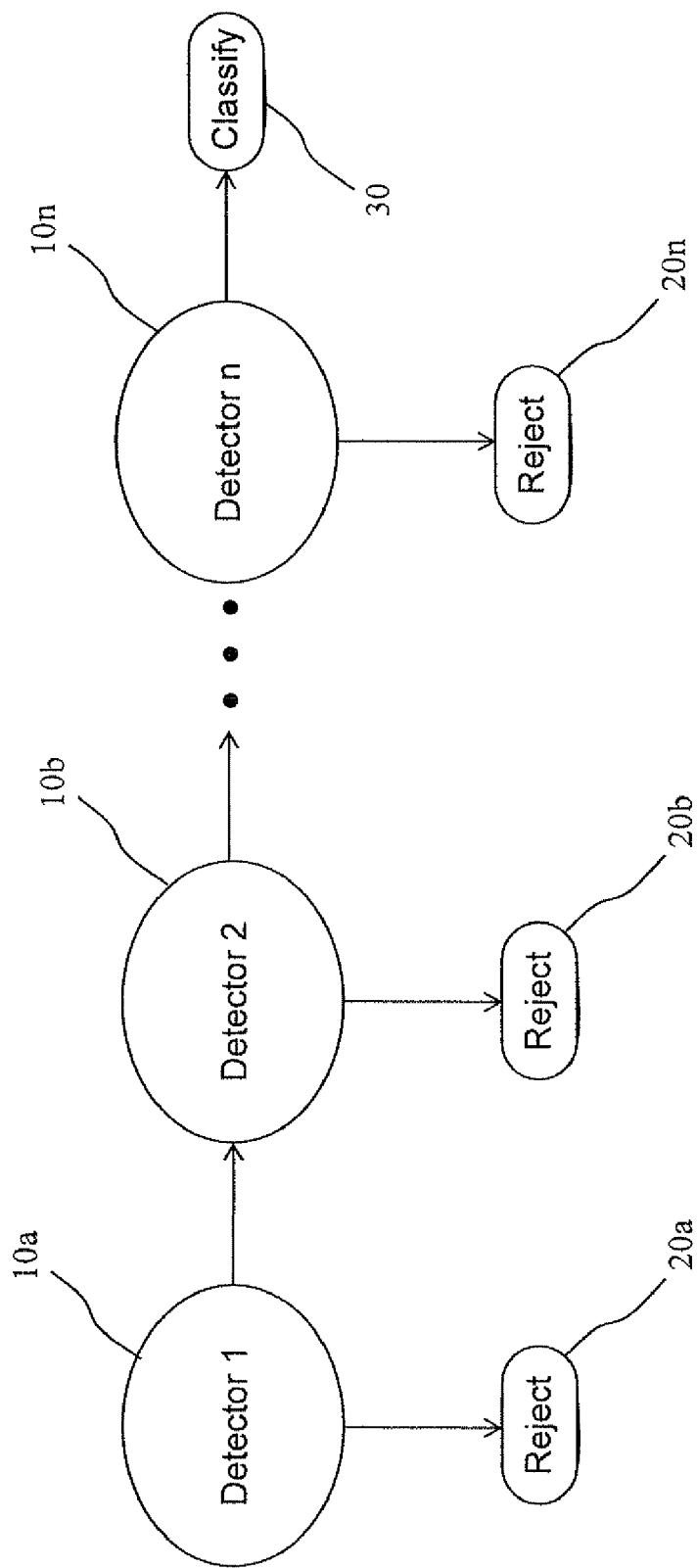
FIG. 1 (prior art) shows examples cascade of detectors and a classifier.
Figure 2:
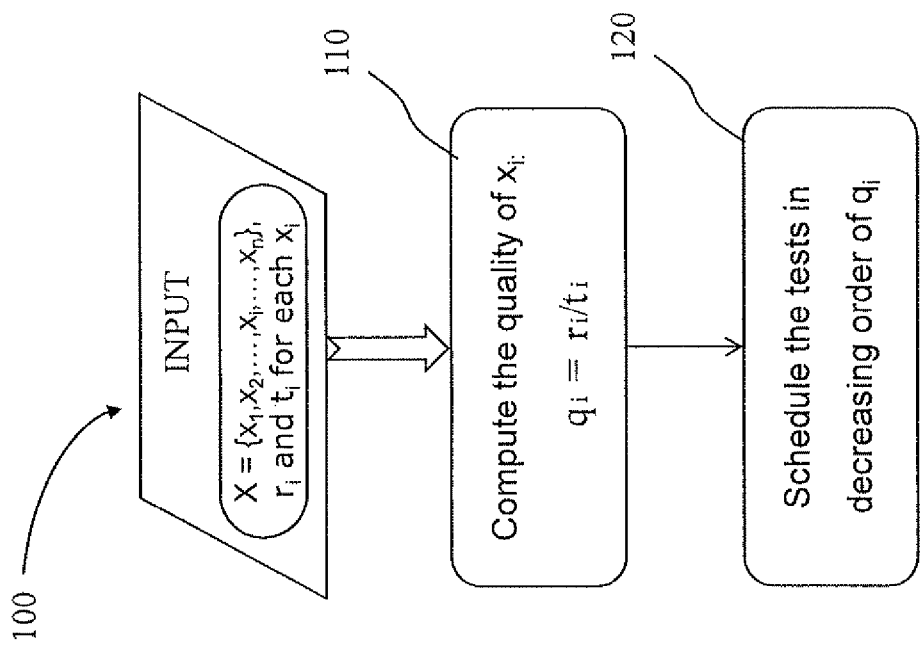
FIG. 2 schematically illustrates a method for optimal expected runtime of a set of tests in a cascade, in accordance with aspects of embodiments of the present invention, wherein the set of tests includes independent tests with no statistical and no ordering constraint.

Reference is now made to FIG. 2, which illustrates method 100 for optimal expected runtime of a set of tests in a cascade, in accordance with aspects of embodiments of the present invention, wherein the set of tests includes independent tests with no statistical dependencies and no ordering constraints. Method 100 includes the following steps:

Step 110: Compute the quality value of test $x_i$: $q_i = r_i/t_i$, where $r_i$ denotes the marginal probability that test $x_i$ rejects examples and $t_i$ denotes the execution time of test $x_i$ or any other cost of executing test $x_i$.

Step 120: Schedule the tests commencing with the highest $q_i$ in decreasing order of $q_i$.

Example 1: if two tests $x_i$ and $x_j$, with $q_i < q_j$, are independent and $x_j$ immediately follows $x_i$, then by exchanging $x_i$ and $x_j$ we reduce the expected runtime of the sequence.

Example 2: suppose X={A, B, C}, where:
A: has a reject probability $r_A = 0.9$ and an execution time of $t_A = 10$;
B: has a reject probability $r_B = 0.5$ and an execution time of $t_B = 1$; and
C: has a reject probability $r_C = 0.01$ and an execution time of $t_C = 0.5$.
Hence:
$q_A = 0.09$;
$q_B = 0.5$ and
$q_C = 0.02$.
Since $q_B > q_A > q_C$, the optimal order is: B, A, C.
The expected runtime of each sequence, as computed by equation (4), is then:

$$ET_{(BAC)} = 1 + 0.5*(10 + 0.1*0.5) = 6.025;$$

$$ET_{(ABC)} = 10 + 0.1*(1 + 0.5*0.01) = 10.1005; \text{ and}$$

$$ET_{(CBA)} = 0.5 + 0.99*(1 + 0.5*10) = 6.44.$$

Second Embodiment: Statistical Independence and Series-Parallel Ordering Constraints The ordering problem with constraints (prerequisites) is an NP-hard (nondeterministic polynomial time) problem. However, for a rather extensive class of partial orders, hereinafter referred to as "series-parallel" structures (similar to the well-known series-parallel graphs), the present invention provides a provably optimal polynomial-time algorithm.

To be a series-parallel structure, the partial order must be specifiable using set construction "parallel" operator { } and the "series" operator→using a read-once expression over the tests.

The semantics of the operators is as follows:
{A,B} groups the A and B test sets and ordering constraints, not adding any constraints. The parallel operator is commutative and associative.

A→B groups the A and B test sets, adding the requirement that all tests in A must appear before all tests in B. The series operator is associative.

Figure 3:
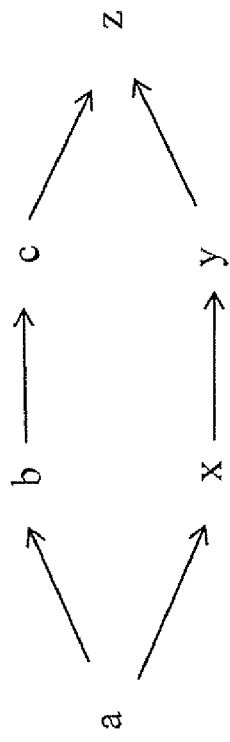
FIG. 3 illustrates a graph representation of the following example of tests with ordering constraints: A→{M, N} →B.

Reference is now made to FIG. 3, which illustrates a standard graph representation of the following example of tests with structural (ordering) constraints is shown: X={A→{M, N}→B}, meaning that B succeeds both M and N, both of which must succeed A.

It should be noted that due to the read-once requirement, the sets of tests A and B are disjoint. The operator notation is extended to allow grouping of several sets of tests. For example, it is allowed to write {A, B, C} instead of {{A, B}, C} and A→B→C instead of A→(B→C).

More examples of series-parallel expressions over tests a, b, c, x, y, z:

(a) a→b→c→x→y→z defines the total order abcxyz.

(b) {a, b, c, x, y, z} defines a completely unconstrained partial order.

(c) {a, b, c}→{x, y, z} defines the K3,3 construct, where a, b, c must all precede x, y, z.

Figure 4:
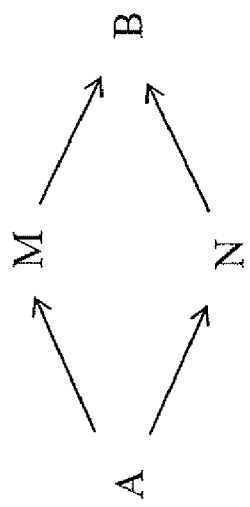
FIG. 4 illustrates a graph representation of the following example of tests with ordering constraints: a→{b→c, x→y}→z.

(d) a→{b→c, x→y}→z defines a construct diverging at a, and merging at z. FIG. 4 illustrates the graph representation of this example.

(e) a→{b→c, x→{y, z}} defines a forward branching tree with a as root.

It should be noted that series-parallel constructs include all partial orders whose structure graph is a tree, as well as all series-parallel directed graphs.

Figure 5:
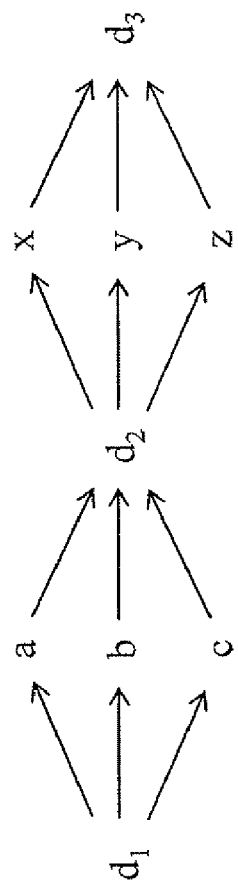
FIG. 5 illustrates a graph representation of the following example of tests with ordering constraints: $d_1$→{a, b, c}→$d_2$→{x, y, z}→$d_3$.

It should be noted that if an arbitrary finite number of dummy tests (that do not affect the partial order with respect to existing tests) are allowed to be added, thereby enhancing the representational power of series-parallel directed graphs, then series-parallel constructs would be exactly equivalent to series-parallel graphs. For instance, the K3,3 directed construct in Example (c) hereinabove is not a series-parallel graph. However, adding dummy tests $d_1$, $d_2$, $d_3$, with precedence $d_1$→{a, b, c}→$d_2${x, y, z}→$d_3$, we get a traditional series-parallel graph structure. FIG. 5 illustrates the graph representation of this example.

It should be noted that the exemplary expression: {b→x, {a, b}→y} is not series-parallel, as the expression is not read-once, having b appearing twice. Hence, polytree structured partial orders are not, in general, series-parallel structures.

Figure 6:
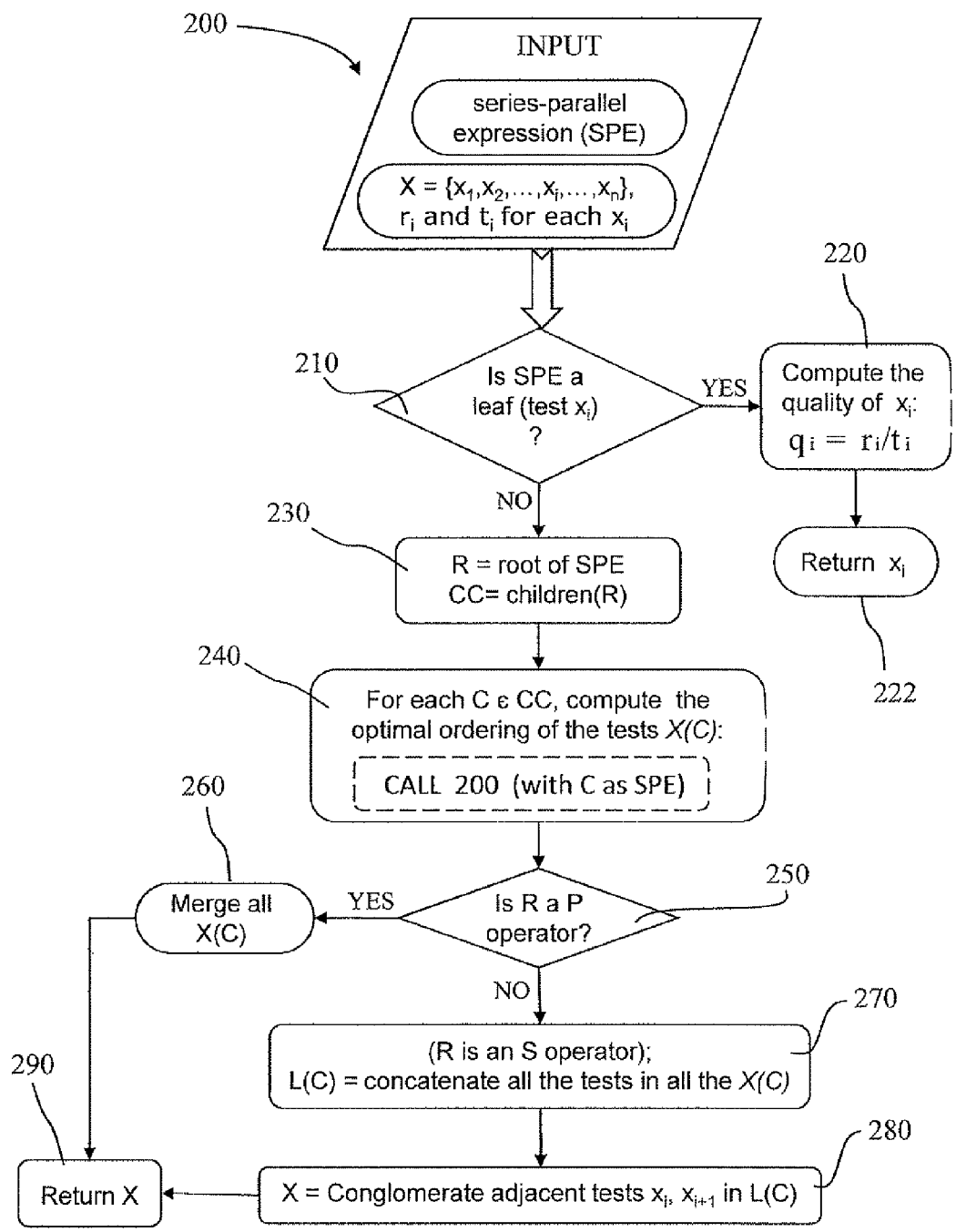
FIG. 6 schematically illustrates a method for optimal expected runtime of a set of tests in a cascade, in accordance with aspects of embodiments of the present invention, wherein the set of tests includes tests in a series-parallel ordering constraint structure with no statistical dependencies.

Reference is now made to FIG. 6, which illustrates recursive method 200 for optimal expected runtime of a set of tests in a cascade, in accordance with aspects of embodiments of the present invention, wherein the set of tests includes independent tests with no statistical dependencies but with ordering constraints.

Method 200 assumes that the tests are statistically independent, but have non-empty ordering constraints, which obey the series-parallel structure. The input to method 200 includes:

(a) A set of tests X, wherein each $x_i \in X$ includes a reject probability $r_i$ and a runtime $t_i$.

(b) A partial order, specified as a read-once series-parallel structure expression (SPE) which is processed as a lexical derivation tree. The internal nodes of this tree are labeled either S for a "series" constructor or P for a "parallel" constructor.

The output of method 200 is an optimal ordering of the tests.

Method 200 is a recursive method, including the following steps:

Step 210: If SPE is not a leaf, go to step 230.

Step 220: Compute the quality value of the test $x_i$: qi=ri/ti, where $r_i$ denotes the marginal probability that test $x_i$ is rejected and $t_i$ denotes the execution time of test $x_i$ or any other cost of executing test $x_i$. This is the basic case where X includes only test $x_i$.

Step 222: returns X (which is a single test $x_i$) and exits.

Step 230: Denote R to be the root of SPE and CC to be the children of R.

Step 240: For each C ∈ CC compute the optimal ordering of the tests X(C), applying method 200 to the tests X(C), with C as the SPE in the recursive call Step 250: If R is a P operator, then apply Merge function 260 to the tests X(C) of each C ∈ CC and go to step 290.

The Merge function (260) gets one or more sorted sequences of tests as the input, and performs a merge by sorting together the tests in all the X(C) in decreasing quality $q_i$, and returns the resulting sequence, being in optimal order.

Step 270: Else R being an S operator, concatenate all the tests in all of the X(C) in the order of appearance in SPE, thereby creating a list L(C) of tests.

Step 280: Conglomerate adjacent tests $x_i$, $x_{i+1}$ in L(C) whenever $q(x_i)<q(x_{i+1})$, until no such cases exist.

Figure 7:
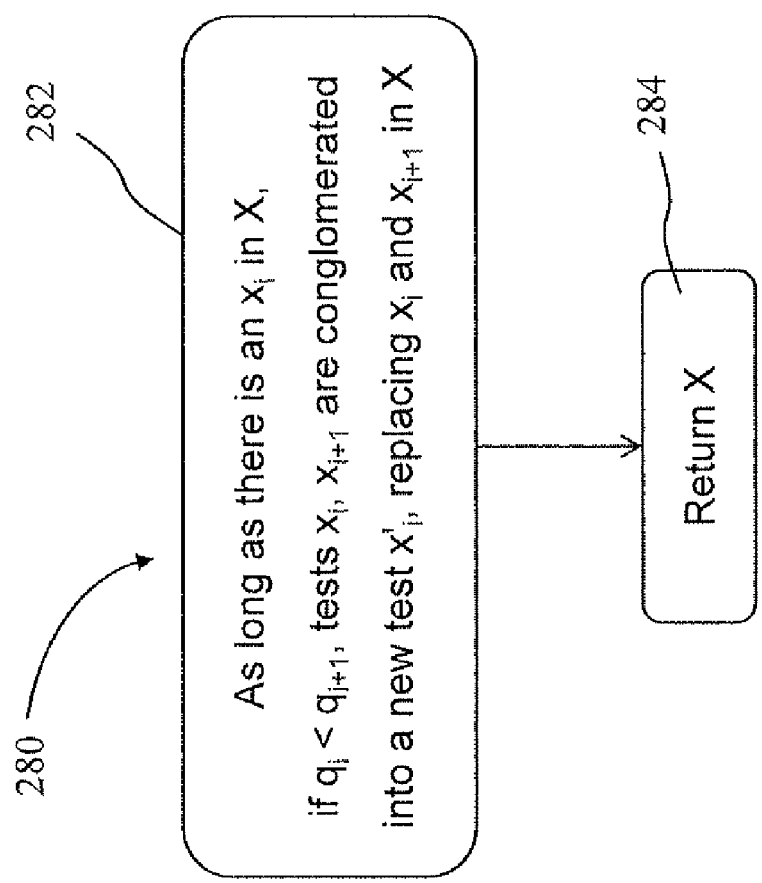
FIG. 7 illustrates the Conglomeration process used by the method shown in FIG. 6.

The conglomeration process (illustrated in FIG. 7) traverses the sequence of tests $x_i$ in L(C), according to the following scheme:

Step 282: Succeeding tests $x_i$, $x_{i+1}$ are conglomerated if $q_i<q_{i+1}$, wherein the result is a new test $x'_i$ that consists of both $x_i$ and $x_{i+1}$. The new test $x'_i$ replaces both $x_i$ and $x_{i+1}$ in L(C). A record is kept of the fact that $x'_i$ is a conglomeration of $x_i$, $x_{i+1}$, along with the new ordered list.

Step 284: When no more tests $x_i$ in L(C) can be conglomerated, the resulting sequence, denoted by X, is returned.

Step 290: When nesting is completed the last returned X is returned as the optimal list of tests X.

Example For Method 200

Figure 9A:
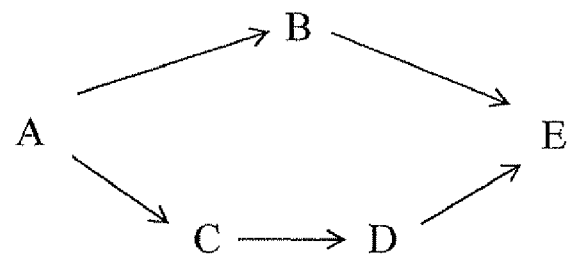
FIG. 9a illustrates a graph representation of a series-parallel structure of tests X, wherein X={A, B, C, D, E} and wherein: A→{B, C→D}→E.
Figure 9B:
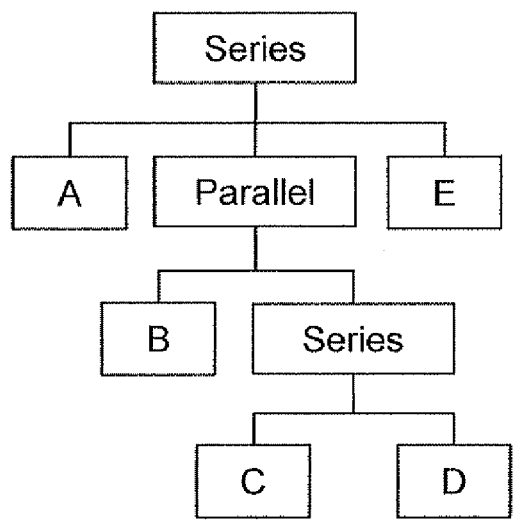

Referring now to FIG. 9a, a series-parallel structure of tests X is shown, wherein X={A, B, C, D, E} and wherein: A→{B, C→D}→E. FIG. 9b is the SPE representation of the example shown in FIG. 9a. Going through the nesting path of method 200, the process reaches the bottom tree level consisting of the singleton list of tests C. The quality of C is computed and returned. Likewise for D. At a higher level, we have the list of tests L(C) containing tests C and D, wherein tests C and D are in series (meaning ordering constraint: C→D). Method 200 sets the order between tests C and D according to the SPE, conglomerating tests if necessary in step 280. If for example $q_C<q_D$, then C and D are conglomerated into a single test CD, and we have X=(CD) going into the next upper level.

The current level of the SPE tree consists of the optimally ordered singleton list X=(CD) returned from the previous level and test B, being in parallel. Hence, method 200 calculates the quality of test B and merges (step 260) test B with (CD), forming an updated optimal ordered list X, which is returned to next level in the SPE tree. If for example $q_B<q_{CD}$, X=(CD, B) going into the next upper level.

The current level of the SPE tree consists of the list the optimal ordered list X=(CD, B) returned from the previous level and tests A and E, being in series. Method 200 calculates the quality of tests A and E (in lower recursive levels), and conglomerates. (step 280) tests A, (CD, B) and E, thereby forming an updated optimal ordered list X, which is returned by method 200 as the final optimal ordered list X. If for example $q_A<q_{CD}$, conglomerating (A, CD) yields ACD. If $q_{ACD}>q_B<q_E$) conglomerating B, E yields BE. Method 200, in this example, returns: (ACD, BE).

An aspect of method 200 is to resolve "equivalent" (with respect to the constraints) tests. Referring back to FIG. 3, a graph representation of the following example of tests, having structural constraints, is shown: X={A→{M, N}→B). Tests M and N are said to be "equivalent" with respect to test A, and thereby tests M and N are ordered in order of the quality of tests M and N.

Figure 8:
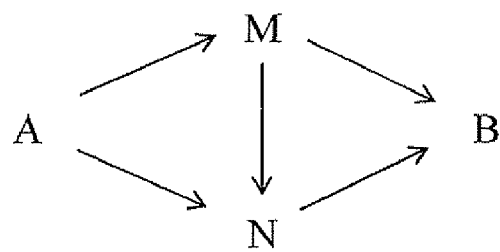
FIG. 8 illustrates of the following example of ordering constraints: A→M→B and A→N→B and M→N.

Reference is also made to FIG. 8, which is a graph representation of the following example of structural constraints is shown: (A→M→B and A→N→B and M→N). In the example shown in FIG. 3, M and N are considered "almost equivalent". In such a case, if the test with the lower quality is constrained to precede the test with the higher quality, then it must immediately precede it. The optimization problem is thus equivalent to one where the tests are conglomerated. Thus, in this case if $q_M<q_N$, a conglomeration step is taken, where M and N are conglomerated into MN, resulting in: $q_M<q_{MN}<q_N$.

Example: suppose X={A, B, C}, where:
A: has a reject probability $r_A=0.9$ and an execution time of $t_A=10$;
B: has a reject probability $r_B=0.5$ and an execution time of $t_B=1$; and
C: has a reject probability $r_C=0.01$ and an execution time of $t_C=0.5$.
Hence:
$q_A=0.09$;
$q_B=0.5$ and
$q_C=0.02$.
Since $q_B>q_A>q_C$, the optimal order is: B, A, C, when no constraints are set.

However, assume addition of the constraint: A→B, with $q_B>q_A$.
We now conglomerate A and B, and the resulting reject probability of the conglomerated test AB is:

$$r_{(AB)}=1-(1-0.9)*(1-0.5)=0.95.$$

The expected runtime of AB, as computed by equation (4), is:

$$ET_{(AB)}=10+0.1*1=10.1.$$

Hence, the quality of conglomerated test AB is:

$$q_{AB}=0.95/10.1=0.094 \text{ (approx)}$$

Hence, the optimal ordering is: (AB)C.

Figure 10:
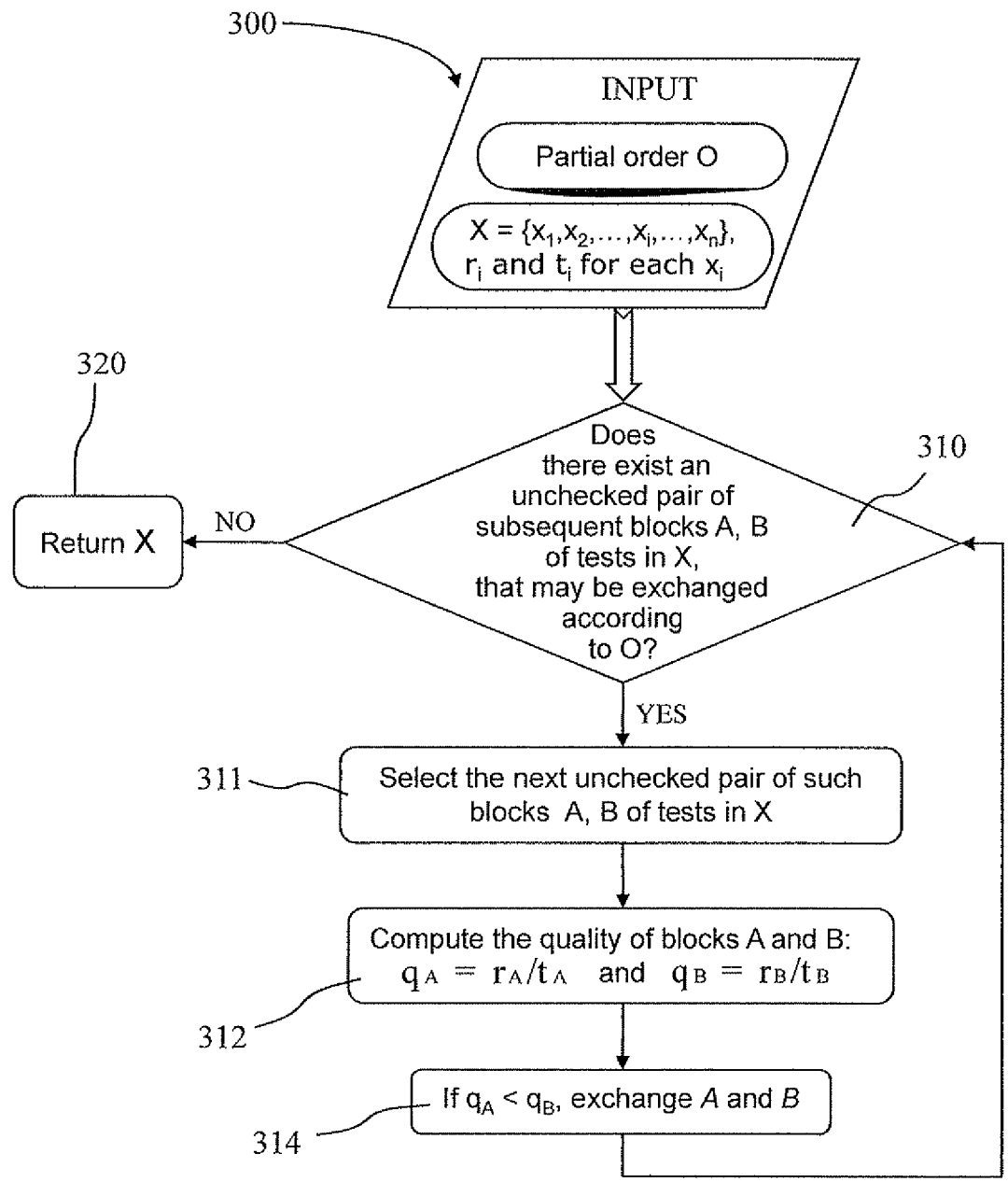
FIG. 10 schematically illustrates a method for optimal expected runtime of a set of tests in a cascade, in accordance with aspects of embodiments of the present invention, wherein the set of tests includes tests with ordering constraint in non-series-parallel structure, but with no statistical dependencies.

Third embodiment: statistical independence and general ordering constraints Reference is now made to FIG. 10, which schematically illustrates method 300 for locally optimal expected runtime of a set of tests in a cascade, in accordance with aspects of embodiments of the present invention, wherein the set of tests includes independent tests with general ordering constraints, not necessarily in a series-parallel structure. For example: the expression: K={b→x, {a, b}→y} is not series-parallel, as the expression is not read-once, having b appearing twice.

Method 300 assumes that the tests are statistically independent, but have non-empty, general ordering constraints. The input to method 300 includes:
(a) An arbitrary set of tests X, wherein each $x_i \in X$ includes a reject probability $r_i$ and a runtime $t_i$.
(b) A partial order as defined by the general ordering constraints.

The output of method 300 is a locally optimal ordering of the tests.

Method 300 includes the following steps:
Step 310: For each pair of previously unchecked subsequent blocks A followed by B of tests (selected in step 311), where a block is any contiguous subsequence of tests,
Step 312: Compute the quality value of block of tests A, denoted by $q_A$, and the quality value of block of tests B, denoted by $q_B$.
Step 314: If $q_A<q_B$ (and there is no constraint forbidding it), exchange A and B.
Step 320: If no further exchanges are possible, return the final list of reordered tests.

For a given a set of tests X, denote S be an arbitrary sequence composed of all the tests in X, and consistent with the prerequisite general ordering constraints. Any sequence S which method 300 cannot continue to improve is referred to as a local minimum. For series-parallel structures, a unique local minimum is guaranteed. But for any deviation from the series-parallel structure, such as exemplified by expression K, it is possible to generate a counterexample showing more than one local minimum.

Nevertheless, applying method 300 results in an approximation algorithm for the general case, including the given exemplary expression K.

Forth Embodiment: Statistically Dependent Pairs and No Ordering Constraints

Figure 11:
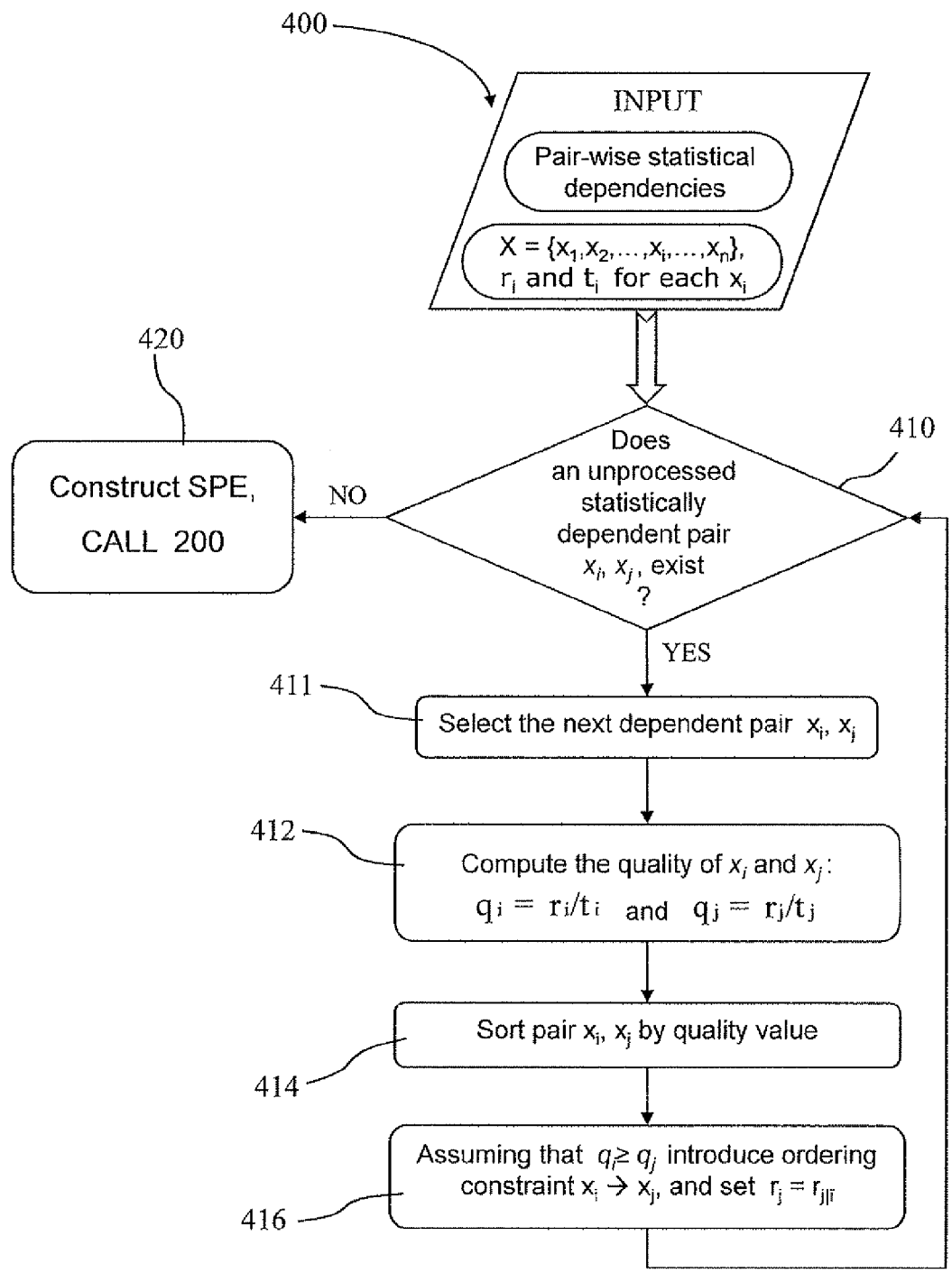
FIG. 11 schematically illustrates a method for optimal expected runtime of a set of tests in a cascade, in accordance with aspects of embodiments of the present invention, wherein the tests are statistically dependent only in pairs.

Reference is now made to FIG. 11, which schematically illustrates method 400 for optimal expected runtime of a set of tests, in accordance with aspects of embodiments of the present invention, wherein the set of tests includes statistically dependent tests with but with no ordering constraints.

Method 400 assumes that the tests are statistically dependent in pairs (allowing also for tests which are completely independent, without loss of generality), but have no ordering constraints. The input to method 400 includes:
(a) An arbitrary set of tests X, wherein each $x_i \in X$, possibly dependent in pairs, includes a reject probability $r_i$ and a runtime $t_i$ and the respective reject probability given the results of dependent tests.
(b) At least one pair of tests $x_j$, $x_i \in X$ having statistical dependency.

The output of method 400 is an optimal ordering of the tests where there exist statistical dependencies between pairs of tests in X.

Method 400 includes the following steps:
Step 410: For each dependent pair $x_i$, $x_j$ (selected in step 411), that has not yet been processed,
Step 412: Compute the quality of $x_i$ and $x_j$.
Step 414: Sort pair $x_i$, $x_j$ by quality value (and by reject value r, if equal in quality).
Step 416: Assuming, without loss of generality, that $q_i \geq q_j$ in X, introduce the respective ordering constraint $x_i \to x_j$, and set $r_j=r_{j|i}$.
Step 420: Use method 200 (for series-parallel structures) to get the optimal ordering for X.

Fifth Embodiment: General Statistical Dependence and Optional Ordering Constraints The algorithm uses $$q_i = \frac{r_i}{t_i}$$

values, but updates the rejection of each feature by taking into account that all previously executed tests have rejected.

Figure 12:
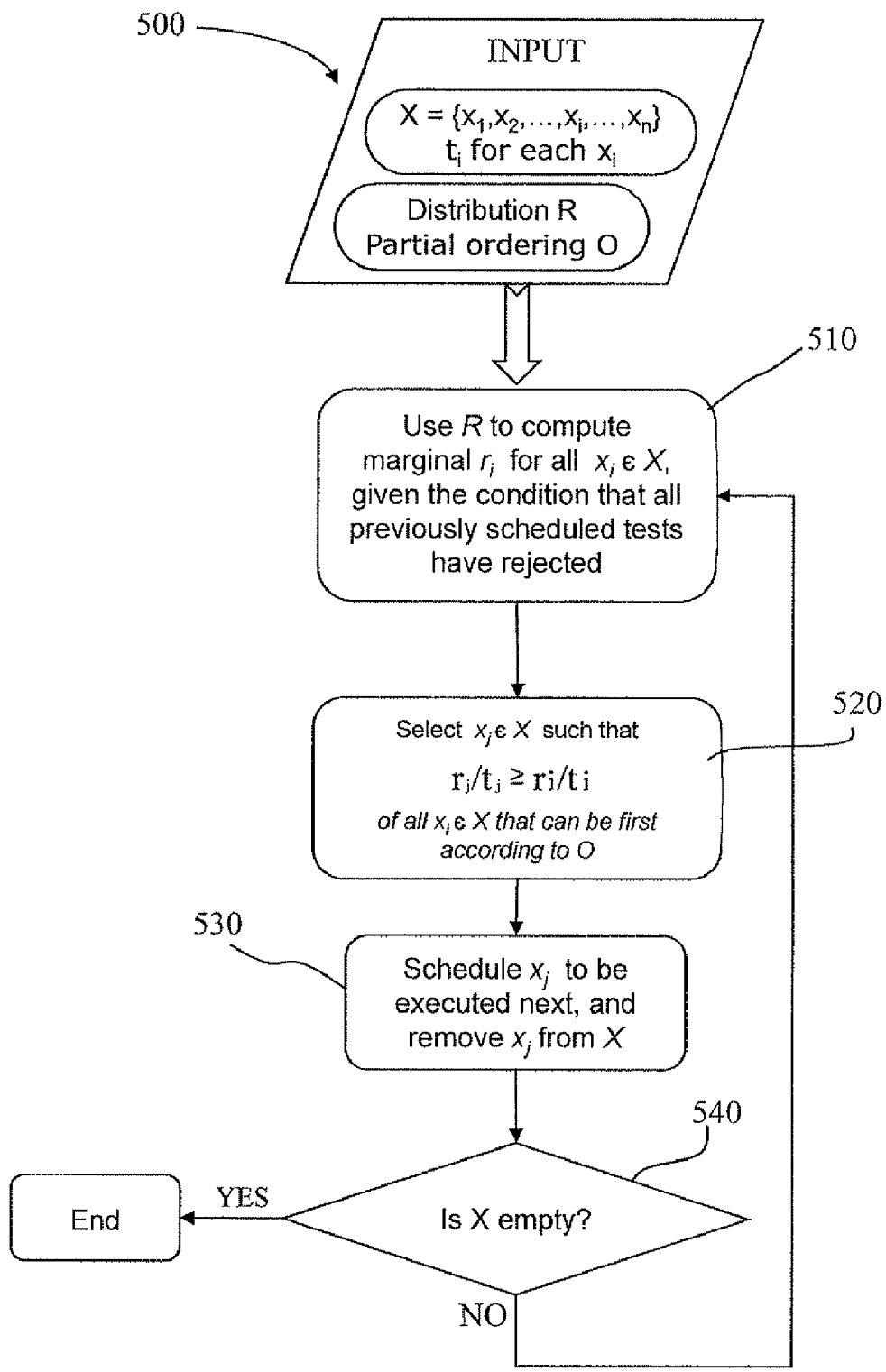
FIG. 12 schematically illustrates a method for optimal expected runtime of a set of tests in a cascade, in accordance with aspects of embodiments of the present invention, wherein the tests are statistically dependent, and an explicit distribution is provided.

Reference is now made to FIG. 12, which schematically illustrates method 500 for optimal expected runtime of a set of tests in a cascade, in accordance with aspects of embodiments of the present invention, wherein the tests includes statistically dependent tests, and an explicit distribution is provided.

Method 500 updates the rejection probability of each test $x_i \in X$ by taking into account that all previously executed tests (Step 510) have rejected. The input to method 500 includes:
- (a) An arbitrary set of tests X.
- (b) A completely specified distribution R over the rejection probabilities.

Method 500 schedules the tests to be executed in an approximately optimal ordering of the tests where there exist statistical dependencies between of tests $x \in X$ defined by R. If there are non-empty ordering constraints (as given by a partial ordering O), they are considered by the algorithm, Method 500 includes the following steps:
Step 510: Compute (or re-compute, if this is not the first pass) marginal $r_i$, values based on R, given that all previously scheduled tests decided "reject".
Step 520: Select $x_j \in X$ preferring highest $$q_j = \frac{r_j}{t_i}$$

from among all tests in X that may be scheduled so as to be consistent with O.

Finding the best $q_j$ is performed by executing method 100 or any other method

Step 530: Schedule $x_j$ as selected in step 520 to be executed next, and remove $x_j$ from X.

Step 540: If tests remain to be scheduled, go to step 510. Otherwise the method ends.

In variations of the present invention, instead of a closed form version of distribution R, a set of training examples (data) and their classes are provided. In such a case, reject probabilities are estimated from the training data D.

Figure 13:
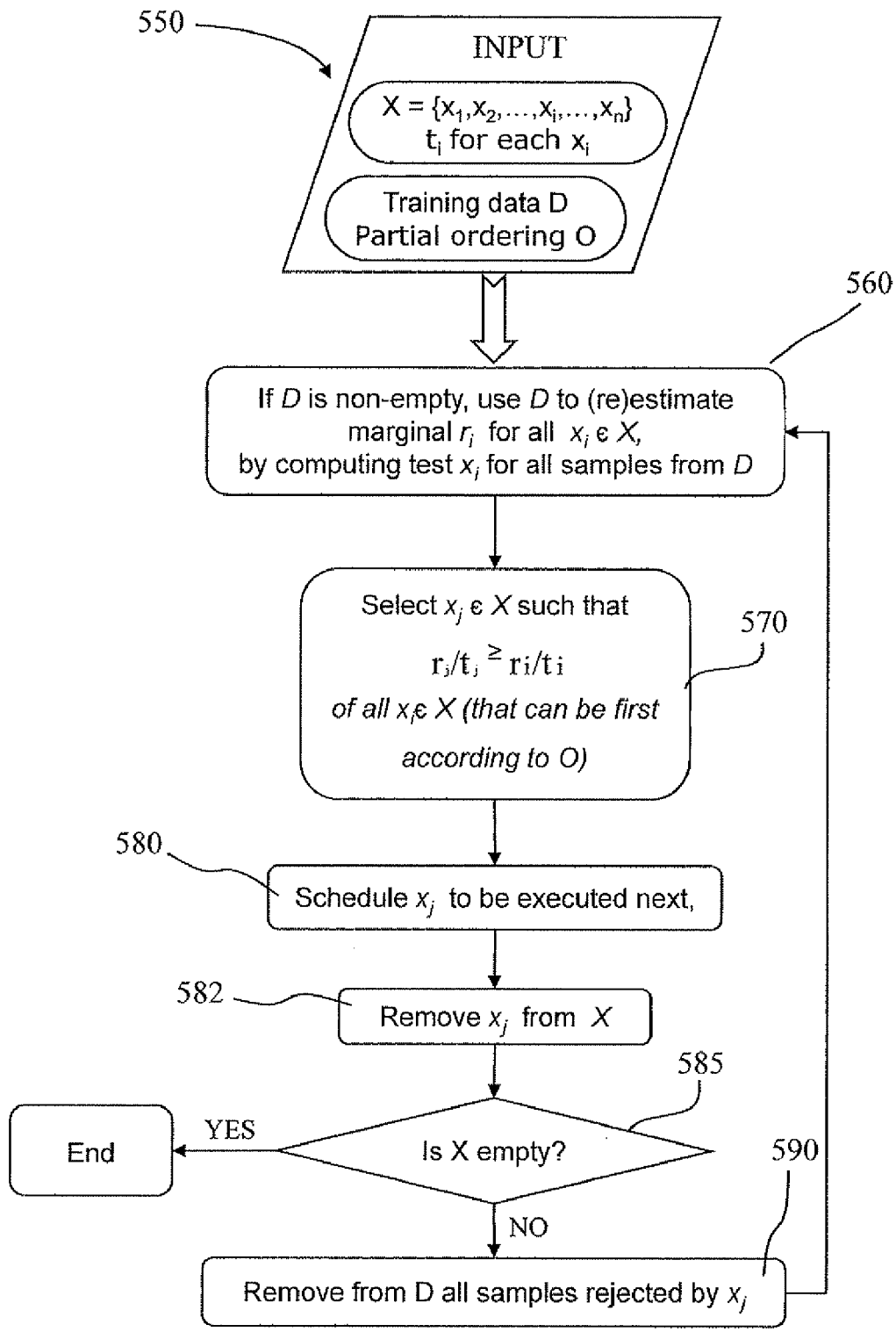
FIG. 13 schematically illustrates a method for optimal expected runtime of a set of tests in a cascade, in accordance with aspects of embodiments of the present invention, wherein the tests are statistically dependent, and a training set of examples is provided.

Reference is now made to FIG. 13, which schematically illustrates method 550 for approximately optimal expected runtime of a set of tests, in accordance with aspects of embodiments of the present invention, wherein the tests are statistically dependent, and a training set of examples is provided. Optionally, ordering constraints may be provided to the system.

Method 550 uses the training data D to estimate the reject probabilities (Step 560), but updates the rejection probability of each test $x_i \in X$ by taking into account previously executed tests through changing the set D accordingly. The input to method 550 includes:
- (a) An arbitrary set of tests X.
- (b) A training data set of examples D.

Method 550 schedules the tests to be executed in an approximately optimal ordering of the tests, where there exist statistical dependencies between of tests $x \in X$, with distributions estimated from D.

Method 550 includes the following steps:
Step 560: Estimate (or re-estimate, if this is not a first pass, and D is not too small, and in particular not empty) $r_i$ values based on the training data set D, by computing the test $x_i$ on all examples from D.
Finding the best qi is performed by executing method 200 or in any other method.

Step 570: Select $x_j \in X$ such that $$\frac{r_j}{t_j} \geq \frac{r_i}{t_i}, \quad \forall x_i \in X$$

and such that when scheduling $x_j$, it does not violate the ordering constraints O. That is, find the test that has the greatest quality $$q_i = \frac{r_i}{t_i}$$

by executing method 100 or any other method.
Step 580: Schedule $x_j$ as selected in step 570 to be executed next.
Step 582: Remove $x_j$ from X.
Step 585: If no tests remain to be scheduled (X is empty), the method ends. Otherwise continue to step 590.
Step 590: Remove examples rejected by $x_j$ from D, and go to step 560.

In variations of the present invention, the "one sided perfect" assumption (the assumption that reject decisions made by tests are always correct) is dropped. Instead, a false reject probability $f_i$ is defined for events when a tests $x_i$ incorrectly rejects a sample. The cost for false reject $f_i$ is C, and the quality of test $x_i$, is:

$$q_i = \frac{r_i}{t_i + C * f_i},$$

It should be noted that when $f_i$=0, we have [0001].

Aspects of the present invention being thus described in terms of several variations and illustrative examples, it will be obvious that the same may be varied in many ways. Such variations are not to be regarded as a departure from the spirit and scope of the described aspects, and to incorporate such modifications as would be obvious to one skilled in the art.

The invention claimed is:

1. A method for optimal ordering of tests in a set of tests, the method comprising:
(a) providing a set of tests X, wherein each $x_i \in X$ includes the marginal reject probability $r_i$ that test $x_i$ rejects and the cost $t_i$ of executing test $x_i$, wherein said tests $x_i \in X$ are statistically independent; wherein at least a first test $x_i \in X$ has an ordering constraint with respect to at least a second test $x_j \in X$; and wherein the only type of ordering constraints allowed obey a series-parallel structure;
(b) providing a partial order, specified as a read-once series-parallel structure expression (SPE) having a lexical derivation tree structure, wherein the internal nodes of said tree are labeled either with a "Series" constructor S or with a "Parallel" constructor P;
(c) processing said set of tests X thereby determining if said SPE contains a single test x, being a single leaf;
(d) when said SPE contains a single leaf, computing the quality value for each test $x_i$ and returning test $x_i$ and said computed quality;
(e) recursively processing said method for optimal ordering of tests in a set of tests X(C), where $C \in CC$, CC denotes the children of R and R is the root of said SPE;
(f) when R is a P constructor, processing said tests X(C) with a merging process;

(g) when R is an S constructor, processing said tests X(C) with a conglomerating process; and (h) scheduling said tests according to tests $x_i$ in resulting X.

2. The method, according to claim 1, wherein said quality value for each test $x_i$, is computed according to:

$$q_i = \frac{r_i}{t_i}.$$

3. The method, according to claim 1, wherein said quality value for each test $x_i$, is computed according to:

$$q_i = \frac{r_i}{t_i + C * f_i},$$

where $f_i$ is the false reject probability and C is the cost tradeoff factor for the false rejections.

4. The method, according to claim 1, wherein said (f) merging process of tests X(C), comprises the steps of:
   i. providing one or more sorted sequences X(C); and
   ii. sorting together all said tests X(C) in decreasing value of quality $q_i$.

5. The method, according to claim 1, wherein said (g) conglomerating process of tests X(C), comprises the steps of:
   i. concatenating all the tests $x_i$ in all of said X(C), in the order of appearance in said SPE, thereby creating a list of tests L(C);
   ii. for all $x_i \in L(C)$, when the quality of succeeding tests $x_i$ and $x_{i+1}$ fulfill $q_i < q_{i+1}$, conglomerating tests xi and $x_{i+1}$, thereby creating a new test $x'_i$ that consists of both $x_i$ and $x_{i+1}$; and
   iii. replacing both $x_i$ and $x_{i+1}$ by said new test $x'_i$ in L(C).

6. The method, according to claim 5, wherein said conglomerating process further comprises the step of:
   iv. recording the fact that $x'_i$ is a conglomeration of $x_i$, $x_{i+1}$, of L(C).

7. The method, according to claim 1, wherein said cost $t_i$ of executing a test $x_i$ is the execution time of said test $x_i$.

8. A method for optimal ordering of tests in a set of tests, the method comprising:
   (a) providing a set of tests X, wherein each $x_i \in X$ includes the marginal reject probability $r_i$ that test $x_i$ rejects and the cost $t_i$ of executing test $x_i$, wherein there exists at least one pair of tests $x_i \in X$ and $x_j \in X$, wherein test $x_i$ is statistically dependent on a test $x_j$;
   (b) providing said statistical dependency;
   (c) for each pair of tests $x_i$ and $x_j$ computing the quality of tests $x_i$ and $X_j$ by:

$$q_i = \frac{r_i}{t_i} \text{ and } q_j = \frac{r_j}{t_j};$$

(d) sorting pairs $x_i$ and $x_j$ by said computed quality;
   (e) when $x_i$ has higher quality than $x_j$ in X:
      i. introducing an ordering constraint $x_i \rightarrow x_j$; and
      ii. setting: $r_j = r_{j|i}$;
   (f) when $x_j$ has higher quality than $x_i$ in X:
      i. introducing an ordering constraint $x_j \rightarrow x_i$; and
      ii. setting: $r_i = r_{i|j}$; and
   (g) performing the method for optimal ordering of tests in a set of tests, according to claim 1.

9. The method, according to claim 8, wherein said cost $t_i$ of executing a test $x_i$ is the execution time of said test $x_i$.

10. A method for locally optimal ordering of tests in a set of tests, the set having cascade architecture, the method comprising:
    (a) providing a set of tests X, wherein each $x_i \in X$ includes the marginal reject probability $r_i$ that test $x_i$ rejects and the cost $t_i$ of executing test $x_i$, wherein said tests $x_i \in X$ are statistically independent, and wherein at least a first test $x_i \in X$ has an ordering constraint with respect to at least a second test $x_j \in X$;
    (b) providing a partial order O;
    (c) processing said set of tests X thereby determining a block A of tests in X can be exchanged with subsequent block B of tests in X, while obeying said order O;
    (d) for all subsequent blocks A and B of tests in X that can be exchanged, providing obeying said order O, computing the quality of blocks A and B by:

$$q_A = \frac{r_A}{t_A} \text{ and } q_B = \frac{r_B}{t_B}; \text{ and}$$

(e) when $q_A < q_B$, exchange blocks A and B in X.

11. The method, according to claim 10, wherein said cost $t_i$ of executing a test $x_i$ is the execution time of said test $x_i$.

12. A method for approximate optimal ordering of tests in a set of tests, the method comprising:
    (a) providing a set of tests X, wherein each $x_i \in X$ includes the cost $t_i$ of executing test $x_i$, having an optional ordering constraint O;
    (b) providing a distribution R over said rejection probabilities r of all $x \in X$;
    (c) using said distribution R for re-computing marginal reject probability $r_i$ values based on said distribution R given the condition that all previously removed tests have rejected;
    (d) selecting $x_j \in X$ such that $$\frac{r_j}{t_j} \geq \frac{r_i}{t_i}, \quad \forall x_i \in X$$

and such that $x_j$ can be scheduled according to said ordering constraint O;
    (e) scheduling said selected $x_j$ to be executed; and
    (f) removing said $x_j$ from X.

13. The method, according to claim 12, wherein said cost ti of executing a test $x_i$ is the execution time of said test $x_i$.

14. The method, according to claim 12, wherein said quality value for each test $x_i$, is computed according to:

$$q_i = \frac{r_i}{t_i}.$$

15. The method, according to claim 12, wherein said quality value for each test $x_i$, is computed according to:

$$q_i = \frac{r_i}{t_i + C * f_i},$$

where $f_i$ is the false reject probability and C is the cost tradeoff factor for the false rejections.

16. A method for approximately optimal ordering of tests in a set of tests, the method comprising:
(a) providing a set of tests X, wherein each $x_i \in X$ includes the marginal reject probability $r_i$ that test $x_i$ rejects and the cost $t_i$ of executing test $x_i$, having an optional ordering constraint O;
(b) providing a training data set of examples D;
(c) initializing and re-computing said marginal reject probability $r_i$ values based on said training data set D, by computing the test $x_i$ on all examples from said training data set D;
(d) selecting $x_j \in X$ such that $$\frac{r_j}{t_j} \geq \frac{r_i}{t_i}, \quad \forall x_i \in X,$$

and such that $x_j$ can be scheduled according to said ordering constraint O;
(e) scheduling said selected $x_j$ to be executed; and
(f) removing examples rejected by $x_j$ from said training data set D.

17. The method, according to claim 16, wherein said cost $t_i$ of executing a test $x_i$ is the execution time of said test $x_i$.

18. The method, according to claim 16, wherein said quality value for each test $x_i$, is computed according to:

$$q_i = \frac{r_i}{t_i}.$$

19. The method, according to claim 16, wherein said quality value for each test $x_i$, is computed according to:

$$q_i = \frac{r_i}{t_i + C * f_i},$$

where $f_i$ is the false reject probability and. C is the cost tradeoff factor for the false rejections.

20. A method of classifying an object, comprising:
(a) providing a set of tests X to be applied to the object, wherein each $x_i \in X$ includes the marginal reject probability $r_i$ that test $x_i$ rejects and the cost $t_i$ of executing test $x_i$, wherein said tests $x_i \in X$ are statistically independent; wherein at least a first test $x_i \in X$ has an ordering constraint with respect to at least a second test $x_j \in X$; and wherein the only type of ordering constraints allowed obey a series-parallel structure;
(b) providing a partial order, specified as a read-once series-parallel structure expression (SPE) having a lexical derivation tree structure, wherein the internal nodes of said tree are labeled either with a "Series" constructor S or with a "Parallel" constructor P;
(c) processing said set of tests X thereby determining if said SPE contains a single test x, being a single leaf;
(d) when said SPE contains a single leaf, computing the quality value for each test $x_i$ and returning test $x_i$ and said computed quality;
(e) recursively processing said method for optimal ordering of tests in a set of tests X(C), where $C \in CC$, CC denotes the children of R and R is the root of said SPE;
(f) when R is a P constructor, processing said tests X(C) with a merging process;
(g) when R is an S constructor, processing said tests X(C) with a conglomerating process;
(h) scheduling said tests according to tests $x_i$ in resulting X; and
(i) applying at least one said test to the object as scheduled, wherein said applying of said at least one test includes acquiring data that is descriptive of at least a portion of the object.

21. A method of classifying an object, the method comprising:
(a) providing a set of tests X to be applied to the object, wherein each $x_i \in X$ includes the marginal reject probability $r_i$ that test $x_i$ rejects and the cost $t_i$ of executing test $x_i$, wherein said tests $x_i \in X$ are statistically independent, and wherein at least a first test $x_i \in X$ has an ordering constraint with respect to at least a second test $x_j \in X$;
(b) providing a partial order O;
(c) processing said set of tests X thereby determining a block A of tests in X can be exchanged with subsequent block B of tests in X, while obeying said order O;
(d) for all subsequent blocks A and B of tests in X that can be exchanged, providing obeying said order O, computing the quality of blocks A and B by: $q_A = r_A | t_A$ and $q_B = r_B | t_B$;
(e) when $q_A < q_B$, exchange blocks A and B in X; and
(f) subsequent to step (e), applying at least one said test to the object in the order of said tests in X, wherein said applying of said at least one test includes acquiring data that is descriptive of at least a portion of the object.

22. A method of classifying an object, the method comprising:
(a) providing a set of tests X to be applied to the object, wherein each $x_i \in X$ includes the marginal reject probability $r_i$ that test $x_i$ rejects and the cost $t_i$ of executing test $x_i$, wherein there exists at least one pair of tests $x_i \in X$ and $x_j \in X$, wherein test $x_i$ is statistically dependent on a test $x_j$;
(b) providing said statistical dependency;
(c) for each pair of tests $x_i$ and $x_j$ computing the quality of tests $x_i$ and $x_j$ by: $q_i = r_i | t_i$ and $q_j = r_j | t_j$;
(d) sorting pairs $x_i$ and $x_j$ by said computed quality;
(e) when $x_i$ has higher quality than $x_j$ in X:
  i. introducing an ordering constraint $x_i \rightarrow x_j$; and
  ii. setting: $r_{j=rj|j}$;
(f) when $x_j$ has higher quality than $x_i$ in X:
  i. introducing an ordering constraint $x_j \rightarrow x_i$; and
  ii. setting: $r_i = r_{i|j}$;
(g) providing a partial order, specified as a read-once series-parallel structure expression (SPE) having a lexical derivation tree structure, wherein the internal nodes of said tree are labeled either with a "Series" constructor S or with a "Parallel" constructor P;
(h) processing said set of tests X thereby determining if said SPE contains a single test x, being a single leaf;
(i) when said SPE contains a single leaf, returning each test $x_i$ and said computed quality $q_i$ thereof;
(j) recursively processing said method for optimal ordering of tests in a set of tests X(C), where $C \in CC$, CC denotes the children of R and R is the root of said SPE;
(k) when R is a P constructor, processing said tests X(C) with a merging process;
(l) when R is an S constructor, processing said tests X(C) with a conglomerating process;
(m) scheduling said tests according to tests $x_i$ in resulting X; and (n) applying at least one said test to the object as scheduled, wherein said applying of said at least one test includes acquiring data that is descriptive of at least a portion of the object.

23. A method of classifying an object, the method comprising:
   (a) providing a set of tests X, wherein each $x_i \in X$ includes the cost $t_i$ of executing test $x_i$, having an optional ordering constraint O;
   (b) providing a distribution R over said rejection probabilities r of all $x \in X$;
   (c) using said distribution R for re-computing marginal reject probability $r_i$ values based on said distribution R given the condition that all previously removed tests have rejected;
   (d) selecting $x_j \in X$ such that $r_j|t_j \geq r_i|t_i, \forall x_i \in X$ and such that $x_j$ can be scheduled according to said ordering constraint O;
   (e) scheduling said selected $x_j$ to be executed;
   (f) removing said $x_j$ from X; and
   (g) applying at least one said test to the object as scheduled, wherein said applying of said at least one test includes acquiring data that is descriptive of at least a portion of the object.

24. A method of classifying an object, the method comprising:
   (a) providing a set of tests X, wherein each $x_i \in X$ includes the marginal reject probability $r_i$ that test $x_i$ rejects and the cost $t_i$ of executing test $x_i$, having an optional ordering constraint O;
   (b) providing a training data set of examples D;
   (c) initializing and re-computing said marginal reject probability $r_i$ values based on said training data set D, by computing the test $x_i$ on all examples from said training data set D;
   (d) selecting $x_j \in X$ such that $r_j|t_j \geq r_i|t_i, \forall x_i \in X$, and such that $x_j$ can be scheduled according to said ordering constraint O;
   (e) scheduling said selected $x_j$ to be executed;
   (f) removing examples rejected by $x_j$ from said training data set D; and
   (h) applying at least one said test to the object as scheduled in step (e), wherein said applying of said at least one test includes acquiring data that is descriptive of at least a portion of the object.

* * * * *